US010318386B1

(12) United States Patent
Zhu

(10) Patent No.: US 10,318,386 B1
(45) Date of Patent: Jun. 11, 2019

(54) SYSTEMS AND METHODS FOR MAINTAINING REMOTE BACKUPS OF REVERSE-INCREMENTAL BACKUP DATASETS

(71) Applicant: Symantec Corporation, Mountain View, CA (US)

(72) Inventor: Baishen Zhu, Sanford, FL (US)

(73) Assignee: Veritas Technologies LLC, Santa Clara, CA (US)

( * ) Notice: Subject to any disclaimer, the term of this patent is extended or adjusted under 35 U.S.C. 154(b) by 336 days.

(21) Appl. No.: 14/177,195

(22) Filed: Feb. 10, 2014

(51) Int. Cl.
*G06F 7/00* (2006.01)
*G06F 11/14* (2006.01)

(52) U.S. Cl.
CPC ...... *G06F 11/1451* (2013.01); *G06F 11/1446* (2013.01)

(58) Field of Classification Search
CPC .................................................. G06F 11/1446
USPC .......................................................... 707/645
See application file for complete search history.

(56) References Cited

U.S. PATENT DOCUMENTS

| 5,069,490 | A | * | 12/1991 | Halen, Jr. | ............... | F16L 21/04 |
| | | | | | | 285/337 |
| 5,381,545 | A | * | 1/1995 | Baker | ................. | G06F 11/1451 |
| | | | | | | 707/999.202 |
| 5,720,026 | A | * | 2/1998 | Uemura | .............. | G06F 11/1451 |
| | | | | | | 707/999.202 |
| 6,088,694 | A | * | 7/2000 | Burns | ................ | G06F 11/1451 |
| 6,101,585 | A | * | 8/2000 | Brown | ................ | G06F 11/1451 |
| | | | | | | 711/162 |
| 6,397,229 | B1 | * | 5/2002 | Menon | ................ | G06F 11/1451 |
| | | | | | | 707/641 |
| 6,915,316 | B1 | * | 7/2005 | Patterson | ............ | G06F 11/1471 |
| 7,266,574 | B1 | * | 9/2007 | Boudrie | .............. | G06F 11/1451 |
| | | | | | | 707/646 |
| 7,370,164 | B1 | * | 5/2008 | Nagarkar | ............ | G06F 11/1451 |
| | | | | | | 707/999.202 |
| 7,483,929 | B2 | * | 1/2009 | Kulkarni | ............. | G06F 11/1451 |
| 7,743,028 | B1 | * | 6/2010 | Stringham | .......... | G06F 11/1451 |
| | | | | | | 707/646 |

(Continued)

OTHER PUBLICATIONS

Santosh Kalekar; Systems and Methods for Virtual Disk Usage Transparency; U.S. Appl. No. 13/364,290, filed Feb. 1, 2012.

(Continued)

*Primary Examiner* — Eliyah S. Harper
(74) *Attorney, Agent, or Firm* — FisherBroyles, LLP

(57) ABSTRACT

A computer-implemented method for maintaining remote backups of reverse-incremental backup datasets may include (1) receiving a request to replicate a reverse-incremental backup dataset of a data source (e.g., a local full backup of the data source and/or at least one reverse incremental backup of the data source) from a primary storage system to a secondary storage system and (2) generating, in response to receiving the request, a forward-incremental backup dataset of the data source (e.g., a remote full backup of the data source and/or at least one forward incremental backup of the data source) on the secondary storage system based at least in part on the reverse-incremental backup dataset. Various other methods, systems, and computer-readable media are also disclosed.

20 Claims, 12 Drawing Sheets

(56) References Cited

U.S. PATENT DOCUMENTS

| | | | | |
|---|---|---|---|---|
| 7,756,833 B2* | 7/2010 | Van Ingen | .......... | G06F 11/1451 707/640 |
| 7,797,279 B1* | 9/2010 | Starling | .............. | G06F 11/1451 707/641 |
| 7,865,473 B2* | 1/2011 | Augenstein | ......... | G06F 11/1451 707/645 |
| 7,873,601 B1* | 1/2011 | Kushwah | ............ | G06F 11/1451 707/654 |
| 8,028,194 B2* | 9/2011 | Atluri | ................ | G06F 11/0727 707/602 |
| 8,037,032 B2* | 10/2011 | Pershin | ............... | G06F 11/1451 707/602 |
| 8,041,679 B1* | 10/2011 | Narayanan | .......... | G06F 11/1471 707/645 |
| 8,200,638 B1* | 6/2012 | Zheng | ................ | G06F 11/1469 707/679 |
| 8,341,122 B2* | 12/2012 | Sawdon | ............. | G06F 11/1451 707/641 |
| 8,370,312 B1 | 2/2013 | Sawhney et al. | | |
| 8,443,159 B1 | 5/2013 | Stringham | | |
| 8,495,022 B1* | 7/2013 | Zhu | ..................... | G06F 11/1451 707/645 |
| 8,600,935 B1 | 12/2013 | Dantkale et al. | | |
| 8,635,187 B2* | 1/2014 | Beatty | ................. | G06F 11/1451 707/646 |
| 8,671,279 B2* | 3/2014 | Brouwer | ................ | G06F 11/10 707/646 |
| 8,793,217 B2* | 7/2014 | Karonde | ............. | G06F 11/1448 707/646 |
| 8,825,972 B1* | 9/2014 | Tsaur | .................. | G06F 11/1453 707/646 |
| 8,832,029 B2* | 9/2014 | Bezbaruah | .......... | G06F 9/45558 707/646 |
| 2008/0104145 A1* | 5/2008 | Lipman | ............... | G06F 11/1456 |
| 2009/0307286 A1* | 12/2009 | Laffin | ................. | G06F 11/1451 |
| 2011/0218967 A1* | 9/2011 | Sliger | ..................... | G06F 12/00 707/647 |
| 2014/0181027 A1* | 6/2014 | Whitehead | ........ | G06F 17/30174 707/639 |

OTHER PUBLICATIONS

Santosh Kalekar, et al; Systems and Methods for File-Level Replication; U.S. Appl. No. 13/646,858, filed Oct. 8, 2012.

Ashutosh Bahadure; Systems and Methods for Enabling Efficient Access to Incremental Backups; U.S. Appl. No. 13/873,211, filed Apr. 29, 2013.

Niranjan Pendharkar, et al; Systems and Methods for Enabling Replication Targets to Reclaim Unused Storage Space on Thin-Provisioned Storage Systems; U.S. Appl. No. 12/712,186, filed Feb. 24, 2010.

"Veeam Backup & Replication 5.0, User Guide", htttps://communities.vmware.com/servlet/JiveServlet/download/1767712-64701/veeam.pdf, as accessed Dec. 17, 2013, Veeam Software, Inc., (Oct. 2010).

Gaurav Makin, et al; Systems and Methods for Restoring Distributed Applications Within Virtual Data Centers; U.S. Appl. No. 13,972,426, filed Aug. 21, 2013.

* cited by examiner

SYSTEMS AND METHODS FOR MAINTAINING REMOTE BACKUPS OF REVERSE-INCREMENTAL BACKUP DATASETS

BACKGROUND

In the digital age, organizations increasingly rely on digitally-stored data. To protect against data loss, an organization may use a backup system to back up important data. Some traditional backup systems may utilize reverse-incremental backup datasets to back up data. In general, a reverse-incremental backup dataset of a data source may include (1) a full backup that backs up the most recent state of the data source and (2) one or more reverse-incremental backups that backs up the difference between the most recent state of the data source and prior states of the data source. In general, the most recent state of the data source may be restored directly from the full backup, and prior states of the data source may be restored by applying one or more of the reverse incremental backups to the full backup.

Many organizations rely upon data replication to conserve storage resources and/or to improve the reliability, fault-tolerance, and/or accessibility of their data. Data replication typically involves replicating data from a primary storage system to a remote secondary storage system. Unfortunately, replicating reverse-incremental backup datasets to remote secondary storage systems may produce unwanted results. For example, because the most recent backup in a reverse-incremental backup dataset may always be a full backup, replicating a reverse-incremental backup dataset to a remote secondary storage system may result in a full backup being transmitted to and stored on the remote secondary storage system each time data is backed up. Accordingly, the instant disclosure identifies and addresses a need for additional and improved systems and methods for maintaining remote backups of reverse-incremental backup datasets.

SUMMARY

As will be described in greater detail below, the instant disclosure generally relates to systems and methods for maintaining remote backups of reverse-incremental backup datasets using forward-incremental backup datasets. In one example, a computer-implemented method for maintaining remote backups of reverse-incremental backup datasets may include (1) receiving a request to replicate a reverse-incremental backup dataset of a data source from a primary storage system to a secondary storage system and (2) generating, in response to receiving the request, a forward-incremental backup dataset of the data source on the secondary storage system based at least in part on the reverse-incremental backup dataset.

In some embodiments, the reverse-incremental backup dataset may include (1) a local full backup of the data source that represents a recent state of the data source and/or (2) at least one reverse incremental backup of the data source that represents at least a portion of a difference between the recent state of the data source and a prior state of the data source, and the forward-incremental backup dataset may include (1) a remote full backup of the data source that represents the prior state of the data source and/or (2) at least one forward incremental backup that represents at least a portion of the difference between the prior state of the data source and the recent state of the data source.

In some embodiments, the step of generating the forward-incremental backup dataset on the secondary storage system may include generating the remote full backup of the data source on the secondary storage system by transferring, from the primary storage system to the secondary storage system, a prior full backup of the data source, and the prior full backup of the data source may include the prior state of the data source.

In some embodiments, the step of generating the forward-incremental backup dataset on the secondary storage system may include generating the forward incremental backup on the secondary storage system by transferring, from the primary storage system to the secondary storage system, the difference between the recent state of the data source and the prior state of the data source, and the forward incremental backup may include the difference between the recent state of the data source and the prior state of the data source.

In some embodiments, the step of generating the forward-incremental backup dataset on the secondary storage system may include generating an additional forward incremental backup on the secondary storage system by transferring, from the primary storage system to the secondary storage system, a difference between the recent state of the data source and a state of the data source represented by the forward incremental backup, the additional forward incremental backup may include the difference between the recent state of the data source and the state of the data source represented by the forward incremental backup, and the forward-incremental backup dataset on the secondary storage system may include the additional forward incremental backup.

In some embodiments, the step of generating the forward-incremental backup dataset on the secondary storage system may include generating, in response to the creation of the local full backup of the data source and at the secondary storage system, an additional remote full backup of the data source that may include the recent state of the data source.

In some embodiments, the step of generating the forward-incremental backup dataset on the secondary storage system may include generating, in response to the creation of the local full backup of the data source and at the secondary storage system, an additional forward incremental backup that may include at least a portion of a difference between a state of the data source represented by the forward incremental backup and the recent state of the data source.

In some embodiments, the step of generating the forward-incremental backup dataset on the secondary storage system may include generating, in response to the creation of the local full backup of the data source and at the secondary storage system, (1) no additional remote full backups of the data source that comprises the recent state of the data source and (2) no additional forward incremental backups that comprises a difference between a state of the data source represented by the forward incremental backup and the recent state of the data source.

In some embodiments, the step of generating the forward-incremental backup dataset on the secondary storage system may include generating the forward-incremental backup dataset of the data source on the secondary storage system according to a remote backup schedule that indicates at least one of (1) a schedule for generating remote full backups at the secondary storage system and/or (2) a schedule for generating forward incremental backups at the secondary storage system.

In some embodiments, the computer-implemented method may further include enabling an administrator to select at least one of (1) the schedule for generating remote full backups at the secondary storage system and/or (2) the schedule for generating forward incremental backups at the secondary storage system.

In one embodiment, the remote backup schedule may be independent of a local backup schedule.

In one embodiment, a system for implementing the above-described method may include (1) a local-backup module, stored in memory, that receives a request to replicate a reverse-incremental backup dataset of a data source from a primary storage system to a secondary storage system, (2) a remote-backup module, stored in memory, that generates, in response to the request, a forward-incremental backup dataset of the data source on the secondary storage system based at least in part on the reverse-incremental backup dataset, and (3) at least one processor configured to execute the local-backup module and the remote-backup module.

In some embodiments, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive a request to replicate a reverse-incremental backup dataset of a data source from a primary storage system to a secondary storage system and (2) generate, in response to receiving the request, a forward-incremental backup dataset of the data source on the secondary storage system based at least in part on the reverse-incremental backup dataset.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
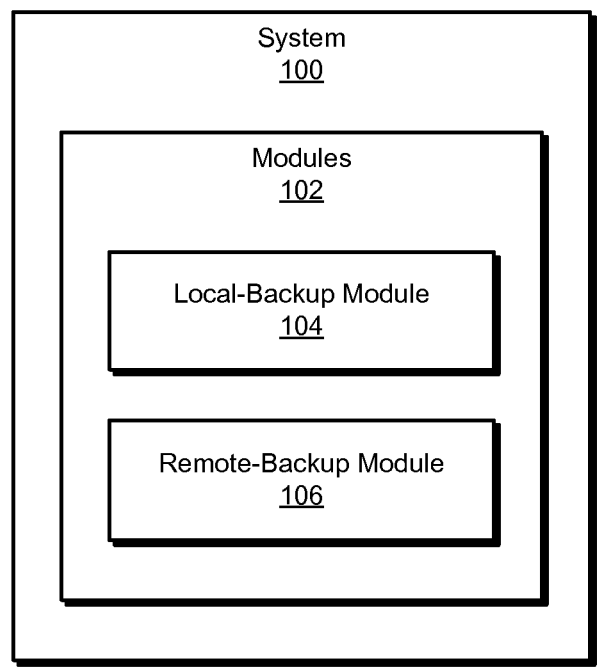
FIG. 1 is a block diagram of an exemplary system for maintaining remote backups of reverse-incremental backup datasets.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for maintaining remote backups of reverse-incremental backup datasets. As will be explained in greater detail below, by maintaining forward-incremental backup datasets as remote backups of reverse-incremental backup datasets, the systems and methods described herein may reduce or eliminate the transmission and/or the storage of redundant data to secondary storage systems. Embodiments of the instant disclosure may also provide various other advantages and features, as discussed in greater detail below.

Figure 2:
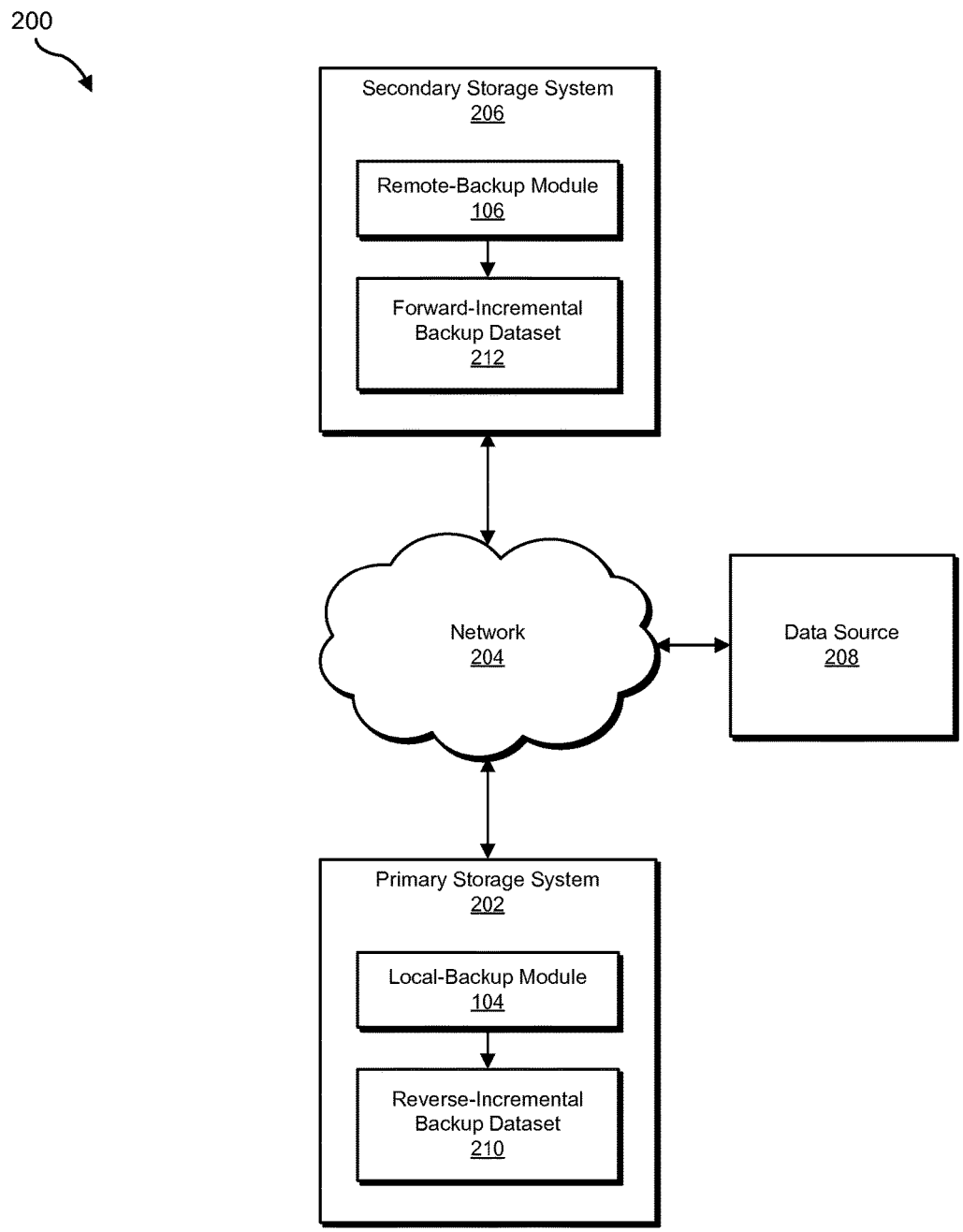
FIG. 2 is a block diagram of an additional exemplary system for maintaining remote backups of reverse-incremental backup datasets.

The following will provide, with reference to FIGS. 1-2, detailed descriptions of exemplary systems for maintaining remote backups of reverse-incremental backup datasets. Detailed descriptions of corresponding computer-implemented methods will also be provided in connection with FIGS. 3-10. In addition, detailed descriptions of an exemplary computing system and network architecture capable of implementing one or more of the embodiments described herein will be provided in connection with FIGS. 11 and 12, respectively.

FIG. 1 is a block diagram of an exemplary system 100 for maintaining remote backups of reverse-incremental backup datasets. As illustrated in this figure, exemplary system 100 may include one or more modules 102 for performing one or more tasks. For example, and as will be explained in greater detail below, exemplary system 100 may include a local-backup module 104 that may receive a request to replicate a reverse-incremental backup dataset of a data source from a primary storage system to a secondary storage system. Exemplary system 100 may additionally include a remote-backup module 106 that may generate a forward-incremental backup dataset of the data source on the secondary storage system based at least in part on the reverse-incremental backup dataset. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., primary storage system 202 and/or secondary storage system 206), computing system 1110 in FIG. 11, and/or portions of exemplary network architecture 1200 in FIG. 12. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a primary storage system 202, a secondary storage system 206, and a data source 208 in communication via a network 204. In one example, primary storage system 202 may be programmed with one or more of modules 102. Additionally or alternatively, secondary storage system 206 may be programmed with one or more of modules 102.

In one embodiment, one or more of modules 102 from FIG. 1 may, when executed by at least one processor of primary storage system 202 and/or secondary storage system 206, enable primary storage system 202 and/or secondary storage system 206 to generate forward-incremental backup datasets from reverse-incremental backup datasets. For example, and as will be described in greater detail below, one or more of modules 102 may cause primary storage system 202 and/or secondary storage system 206 to (1) receive a request to replicate reverse-incremental backup dataset 210 of data source 208 from primary storage system 202 to secondary storage system 206 and (2) generate, in response to receiving the request, forward-incremental backup dataset 212 of data source 208 on secondary storage system 206 based at least in part on reverse-incremental backup dataset 210.

Primary storage system 202 and secondary storage system 206 generally represent any type or form of computing device capable of reading computer-executable instructions and/or any type or form of storage device or system capable of storing and/or managing data. Examples of primary storage system 202 and/or secondary storage system 206 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 1110 in FIG. 11, or any other suitable computing device. For example, primary storage system 202 and/or secondary storage system 206 may represent a backup server, a backup appliance, and/or a server for managing, manipulating, administrating, and/or storing backup data.

Data source 208 generally represents any source of data that may be backed up. Examples of data source 208 include, without limitation, physical or virtual computing systems, virtual disks, physical disks, file systems, volumes, and/or files.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1200 in FIG. 12, or the like. Network 204 may facilitate communication or data transfer using wireless or wired connections. In one embodiment, network 204 may facilitate communication among primary storage system 202, secondary storage system 206, and/or data source 208.

Figure 3:
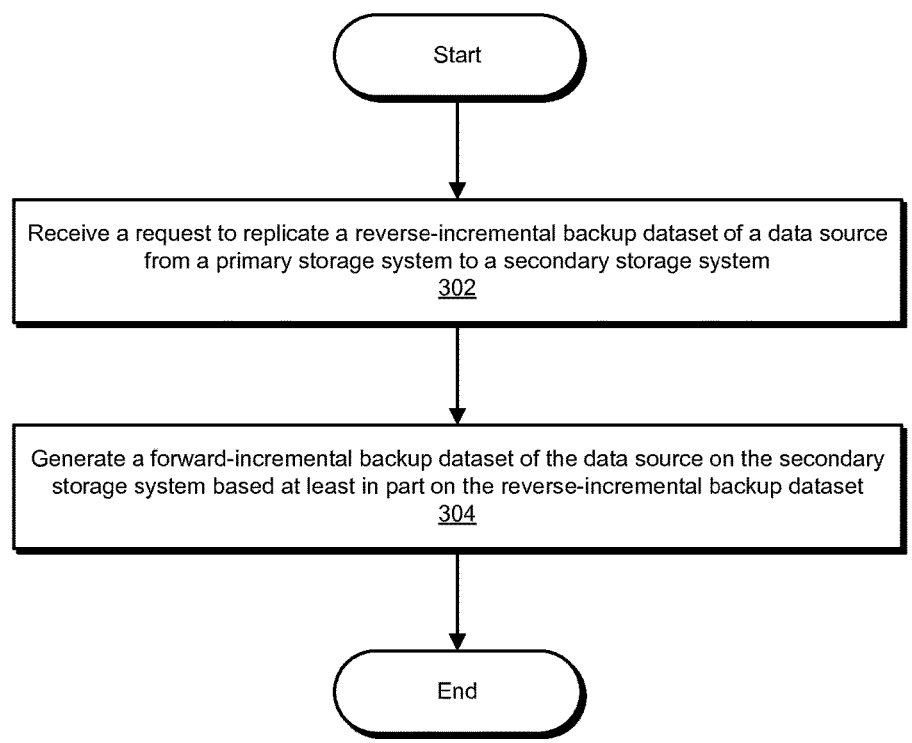
FIG. 3 is a flow diagram of an exemplary method for maintaining remote backups of reverse-incremental backup datasets.

FIG. 3 is a flow diagram of an exemplary computer-implemented method 300 for maintaining remote backups of reverse-incremental backup datasets. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1110 in FIG. 11, and/or portions of exemplary network architecture 1200 in FIG. 12.

As illustrated in FIG. 3, at step 302 one or more of the systems described herein may receive a request to replicate a reverse-incremental backup dataset of a data source from a primary storage system to a secondary storage system. For example, local-backup module 104 may, as part of primary storage system 202 in FIG. 2, receive a request to replicate reverse-incremental backup dataset 210 of data source 208 from primary storage system 202 to secondary storage system 206.

Figure 4:
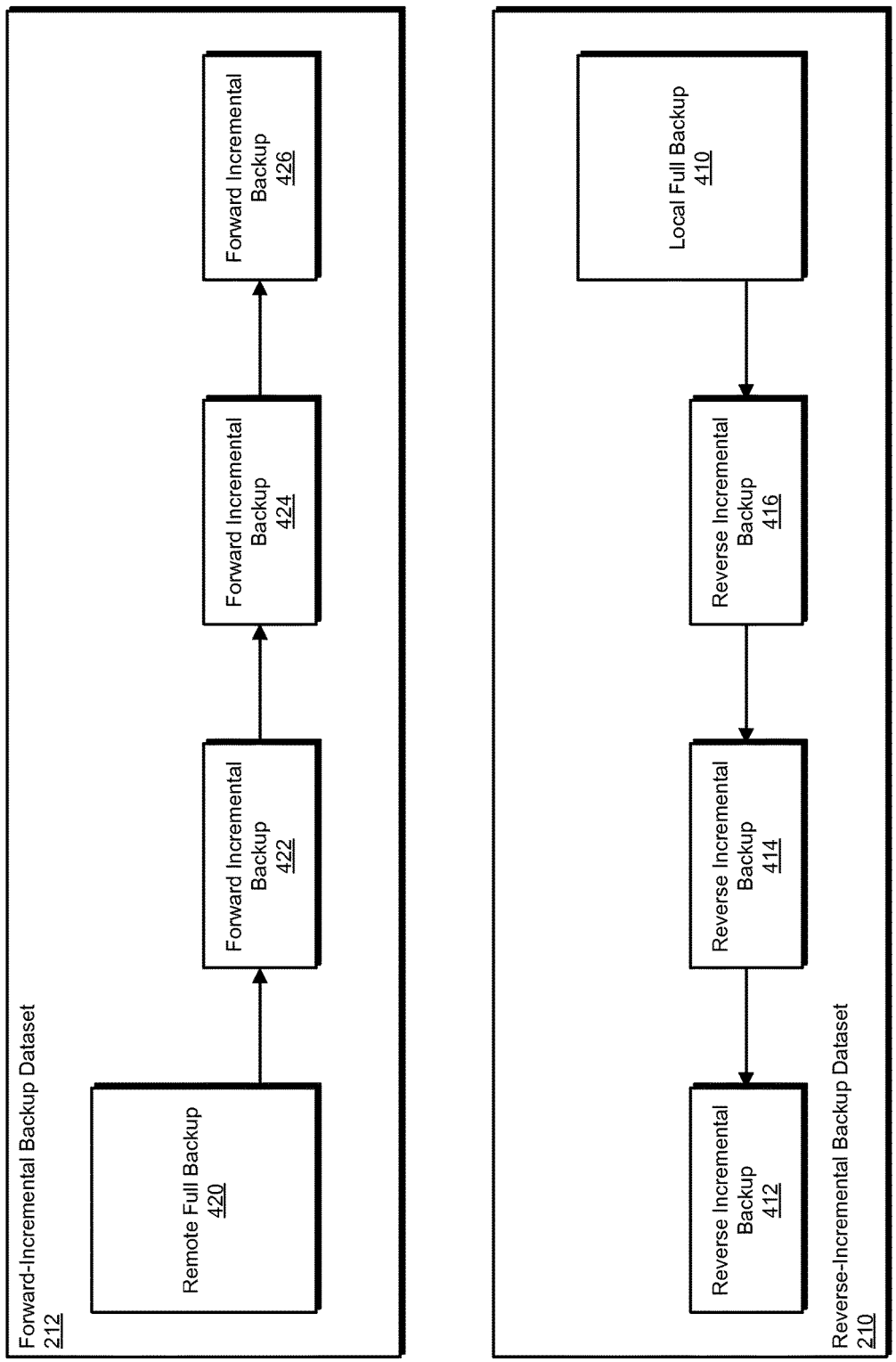
FIG. 4 is a block diagram of exemplary backup datasets.

As used herein, the phrase "reverse-incremental backup dataset" generally refers to any set of backups of a data source that includes (1) one or more full backups of the data source and/or (2) one or more corresponding reverse incremental backups of the data source. FIGS. 4 and 6-10 illustrate exemplary states of reverse-incremental backup dataset 210. As shown in FIG. 4, reverse-incremental backup dataset 210 may include a local full backup 410 and three corresponding reverse incremental backups 412-416. In some examples, a reverse-incremental backup dataset may temporarily include no reverse incremental backups. For example, and as will be explained in greater detail below, a reverse-incremental backup dataset may include only a single full backup of a data source until a subsequent full backup of the data source is created and the prior full backup is replaced by a reverse incremental backup (e.g., as illustrated by reverse-incremental backup dataset 210 in FIGS. 6 and 7).

As used herein, the phrases "full backup," "local full backup," and "remote full backup" may refer to any data backup that includes each data unit (e.g., block, sector, cluster, file, etc.) in a set of data units of a data source. In general, a full backup may include a complete copy of the state of a data source at a particular point in time. For example, a full backup of a volume may include each block in the volume as it existed at a particular point in time. In some examples, a full backup may include a subset of the data of a data source. For example, a full backup may include each of a set of files which have been identified for backup. In some examples, a full backup may include a copy of all data and/or software on a system. For example, a full backup may include all data needed for a complete system restoration.

As used herein, the phrases "incremental backup," "reverse incremental backup," and "forward incremental backup" generally refer to any data backup that includes less than every data unit (e.g., segment, block, sector, cluster, file, etc.) in a set of data units of a data source. In some examples, a reverse incremental backup may include a partial copy of the state of a data source at a particular point in time. In general, a reverse incremental backup may (1) include the difference between two full backups of a data source (e.g., to consecutive full backups), (2) be used to replace the former full backup, and/or (3) be applied to the latter of the two full backups to restore the data source to the state captured by the former full backup. Accordingly, a reverse incremental backup may only include data that was changed (e.g., data that was modified, added, deleted, etc.) between the points in time at which two full backups of a data source are taken.

Figure 5:
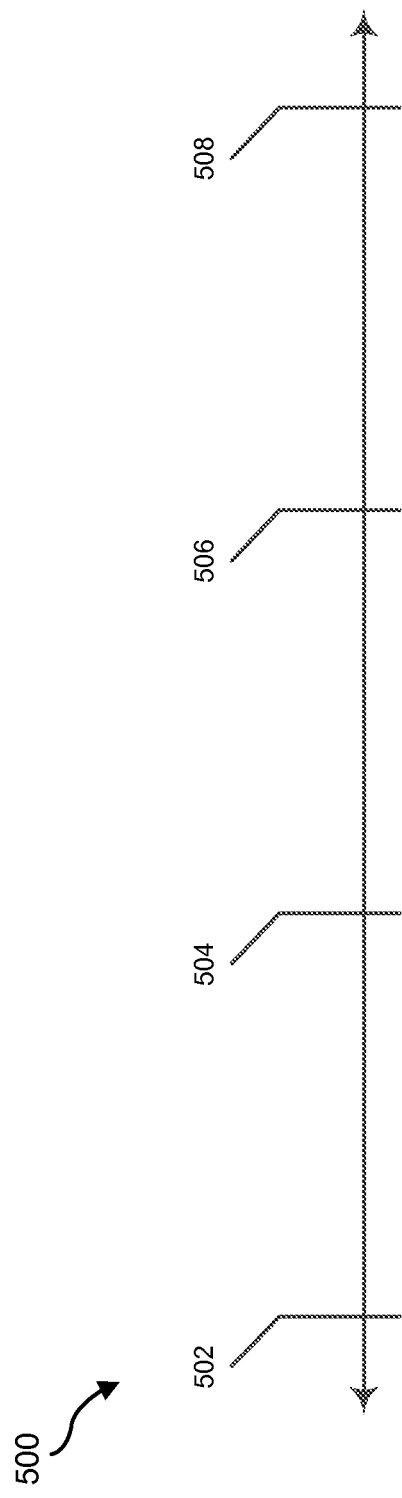
FIG. 5 is a diagram of an exemplary timeline for backing up data.

FIGS. 4-8 provide an example of how a backup system may have created reverse-incremental backup dataset 210 in FIG. 4 over the period of time illustrated by exemplary timeline 500 in FIG. 5. For example, at time 502, the backup system may have created reverse-incremental backup dataset 210 in FIG. 6 by creating a first local full backup 610 of data source 208 that captures the state of data source 208 as of time 502.

Figure 7:
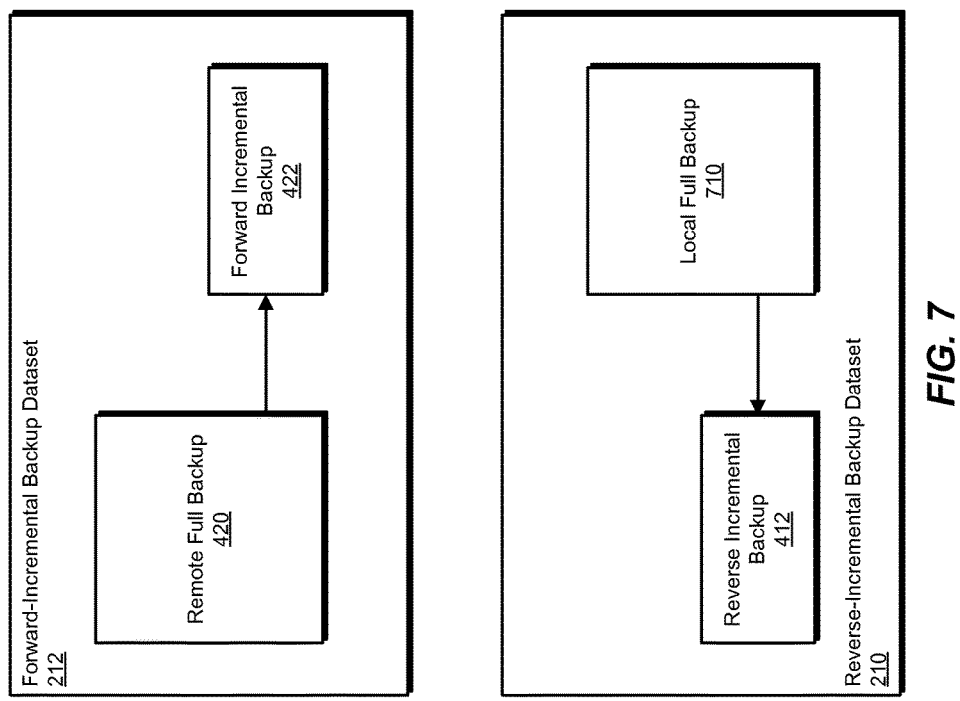
FIG. 7 is a block diagram of exemplary backup datasets.

At time 504, the backup system may have then created reverse-incremental backup dataset 210 in FIG. 7 by (1) creating a second local full backup 710 of data source 208 that captures the state of data source 208 as of time 504, (2) creating a reverse incremental backup 412 that captures the difference between local full backup 610 and local full backup 710, and (3) replacing local full backup 610 with reverse incremental backup 412. In the example illustrated in FIG. 7, the state of data source 208 as of time 504 may be recovered directly from local full backup 710, and the state of data source 208 as of time 502 may be recovered by applying reverse incremental backup 412 to local full backup 710.

Figure 8:
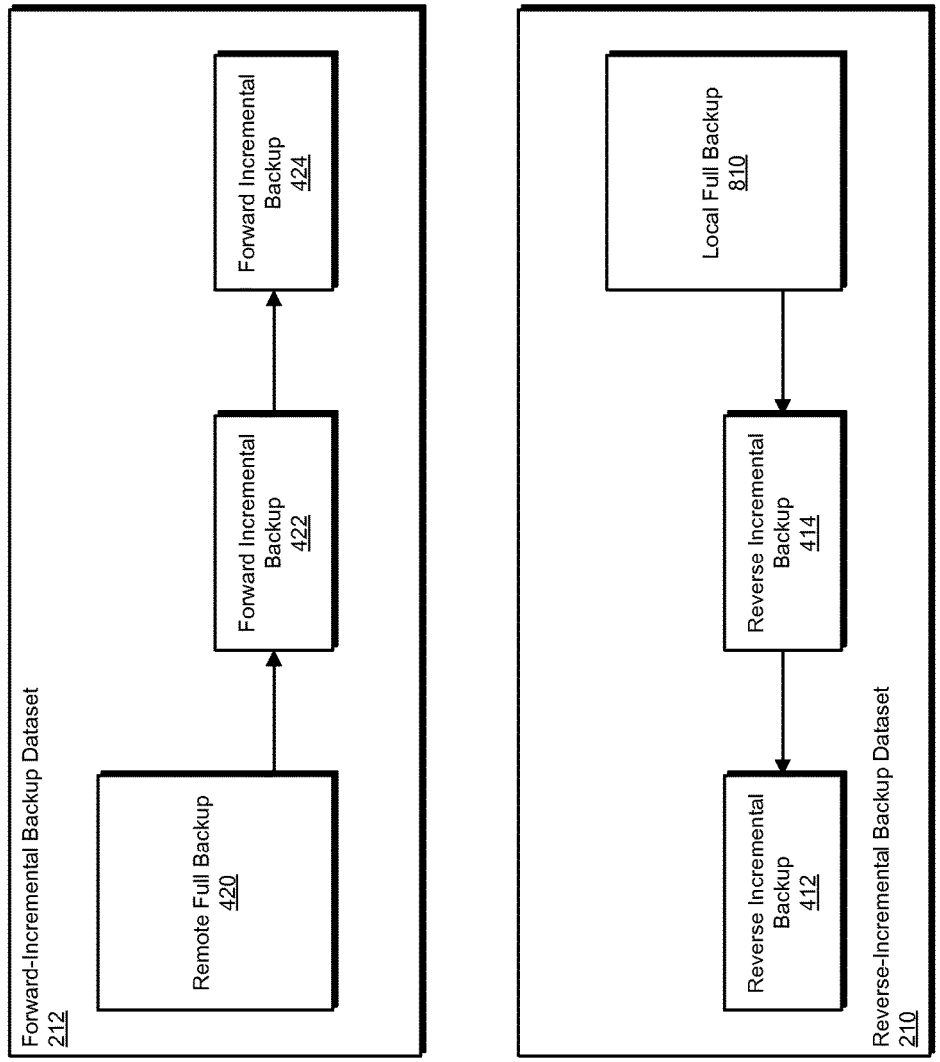
FIG. 8 is a block diagram of exemplary backup datasets.

At time 506, the backup system may have then created reverse-incremental backup dataset 210 in FIG. 8 by (1) creating a third local full backup 810 of data source 208 that captures the state of data source 208 as of time 506, (2) creating a reverse incremental backup 414 that captures the difference between local full backup 710 and local full backup 810, and (3) replacing local full backup 710 with reverse incremental backup 414. In the example illustrated in FIG. 8, the state of data source 208 as of time 506 may be recovered directly from local full backup 810, the state of data source 208 as of time 504 may be recovered by applying reverse incremental backup 414 to local full backup 810, and the state of data source 208 as of time 502 may be recovered by applying reverse incremental backups 412 and 414 to local full backup 810.

At time 508, the backup system may have created reverse-incremental backup dataset 210 in FIG. 4 by (1) creating a fourth local full backup 410 of data source 208 that captures the state of data source 208 as of time 508, (2) creating a reverse incremental backup 416 that captures the difference between local full backup 810 and local full backup 410, and (3) replacing local full backup 810 with reverse incremental backup 416. In the example illustrated in FIG. 4, the state of data source 208 as of time 508 may be recovered directly from local full backup 410, the state of data source 208 as of time 506 may be recovered by applying reverse incremental backup 416 to local full backup 410, the state of data source 208 as of time 504 may be recovered by applying reverse incremental backups 414 and 416 to local full backup 410, and the state of data source 208 as of time 502 may be recovered by applying reverse incremental backups 412-416 to local full backup 410.

Returning to FIG. 3, the systems described herein may perform step 302 in any suitable manner. For example, local-backup module 104 may receive a request from an administrator to replicate an already existing reverse-incremental backup dataset of a data source from a primary storage system to a secondary storage system. In another example, local-backup module 104 may access backup configuration data of a backup system to identify reverse-incremental backup datasets that are subject to being replicated to a secondary storage system.

Additionally or alternatively, local-backup module 104 may receive a request to replicate a reverse-incremental backup dataset of a data source from a primary storage system to a secondary storage system as part of receiving a request (e.g., from an administrator) to create the reverse-incremental backup dataset of the data source on the primary storage system.

At step 304 one or more of the systems described herein may generate, in response to receiving the request, a forward-incremental backup dataset of the data source on the secondary storage system based at least in part on the reverse-incremental backup dataset. For example, remote-backup module 106 may, as part of secondary storage system 206 in FIG. 2, generate forward-incremental backup dataset 212 of data source 208 on secondary storage system 206 based at least in part on reverse-incremental backup dataset 210.

As used herein, the phrase "forward-incremental backup dataset" generally refers to any set of backups of a data source that includes (1) one or more full backups of the data source and/or (2) one or more corresponding forward incremental backups of the data source. FIGS. 4 and 6-10 illustrate exemplary states of forward-incremental backup dataset 212. Using FIG. 4 as an example, forward-incremental backup dataset 212 may include a remote full backup 420 and three corresponding forward incremental backups 422-426. In some examples, a forward-incremental backup dataset may temporarily include no forward incremental backups. For example, and as will be explained in greater detail below, a forward-incremental backup dataset may include only a single full backup of a data source until a forward incremental backup of the data source is created (e.g., as illustrated by forward-incremental backup dataset 212 in FIGS. 6 and 7).

As indicated above, the phrases "full backup" and "remote full backup," as used herein, may refer to any data backup that includes each data unit (e.g., block, sector, cluster, file, etc.) in a set of data units of a data source.

As used herein, the phrase "forward incremental backup" generally refers to any data backup that includes less than every data unit (e.g., segment, block, sector, cluster, file, etc.) in a set of data units of a data source. In general, a forward incremental backup may include a partial copy of the state of a data source at a particular point in time. For example, a forward incremental backup may only include data units that have changed between a previous point in time (e.g., the point in time at which a previous full backup or other forward incremental backup was taken) and the point in time at which the forward incremental backup was taken. Accordingly, a forward incremental backup may only include data that has changed (e.g., data that has been modified, added, deleted, etc.) since a previous full or incremental backup. In general, a forward incremental backup of a data source may be applied to a full backup of the data source to restore the data source to the state of the data source that existed at the point in time at which the forward incremental backup was created.

Returning to FIG. 3, the systems described herein may perform step 304 in any suitable manner. In some examples, remote-backup module 106 may generate a forward-incremental backup dataset of a data source on a secondary storage system based on a reverse-incremental backup dataset of the data source by creating remote full backups and/or forward incremental backups at the secondary storage system in response to the creation of each new local full backup of the reverse-incremental backup dataset. For example, remote-backup module 106 may generate a forward-incremental backup dataset of a data source on a secondary storage system based on a reverse-incremental backup dataset of the data source by generating (1) a remote full backup at the secondary storage system in response to the first local full backup of the reverse-incremental backup dataset and (2) one or more forward incremental backups at the secondary storage system in response to each subsequent local full backup of the reverse-incremental backup dataset.

In general, remote-backup module 106 may generate a remote full backup of a data source on the secondary storage system by (1) transferring a local full backup of the data source from the primary storage system to the secondary storage system and (2) generating the remote full backup from the transferred local full backup. Similarly, in some examples, remote-backup module 106 may generate a forward incremental backup of a data source on the secondary storage system by (1) transferring a reverse incremental backup of the data source (e.g., as a reverse incremental backup or a forward incremental backup) from the primary storage system to the secondary storage system and (2) generating the forward incremental backup from the transferred reverse incremental backup.

Figure 6:
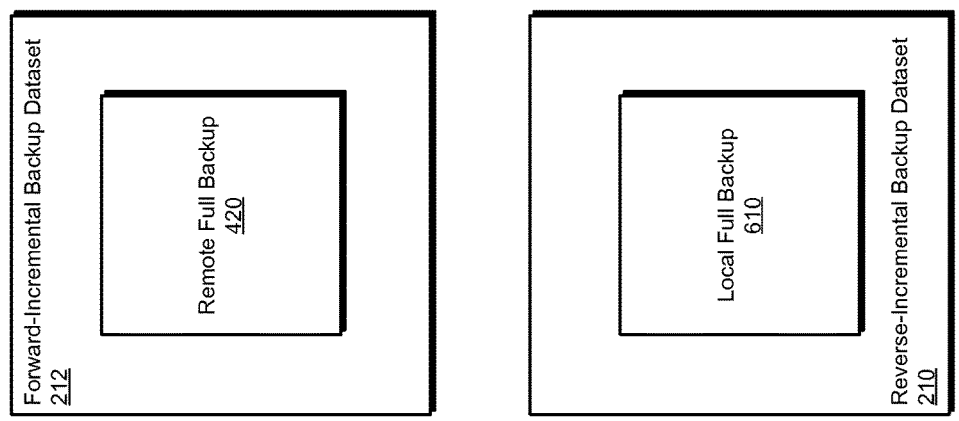
FIG. 6 is a block diagram of exemplary backup datasets.

FIGS. 4-8 provide an example of how the systems and methods described herein may generate forward-incremental backup dataset 212 in FIG. 4 over the period of time illustrated by exemplary timeline 500 in FIG. 5. At or after time 502, remote-backup module 106 may generate forward-incremental backup dataset 212 as shown in FIG. 6 in response to (or at any point in time after) the creation of local full backup 610 by (1) transferring, from primary storage system 202 to secondary storage system 206, local full backup 610 and (2) generating remote full backup 420 from local full backup 610. In this example, the systems and methods disclosed herein may later recover the state of data source 208 as of time 502 directly from remote full backup 420.

At or after time 504, remote-backup module 106 may transform forward-incremental backup dataset 212 as shown in FIG. 6 into forward-incremental backup dataset 212 as shown in FIG. 7 in response to (or at any point in time after) the creation of local full backup 710 and/or reverse incremental backup 412 by (1) transferring reverse incremental backup 412 to secondary storage system 206 and (2) generating forward incremental backup 422 from reverse incremental backup 412. In the example illustrated in FIG. 7, the systems and methods disclosed herein may later recover the state of data source 208 as of time 504 by applying forward incremental backup 422 to remote full backup 420.

At or after time 506, remote-backup module 106 may transform forward-incremental backup dataset 212 as shown in FIG. 7 into forward-incremental backup dataset 212 as shown in FIG. 8 in response to (or at any point in time after) the creation of local full backup 810 and/or reverse incremental backup 414 by (1) transferring reverse incremental backup 414 to secondary storage system 206 and (2) generating forward incremental backup 424 from reverse incremental backup 414. In the example illustrated in FIG. 8, the systems and methods disclosed herein may later recover the state of data source 208 as of time 506 by applying forward incremental backups 422 and 424 to remote full backup 420.

At or after time 508, remote-backup module 106 may transform forward-incremental backup dataset 212 as shown in FIG. 8 into forward-incremental backup dataset 212 as shown in FIG. 4 in response to (or at any point in time after) the creation of local full backup 410 and/or reverse incremental backup 416 by (1) transferring reverse incremental backup 416 to secondary storage system 206 and (2) generating forward incremental backup 426 from reverse incremental backup 416. In the example illustrated in FIG. 4, the systems and methods disclosed herein may later recover the state of data source 208 as of time 508 by applying forward incremental backups 422-426 to remote full backup 420.

Figure 9:
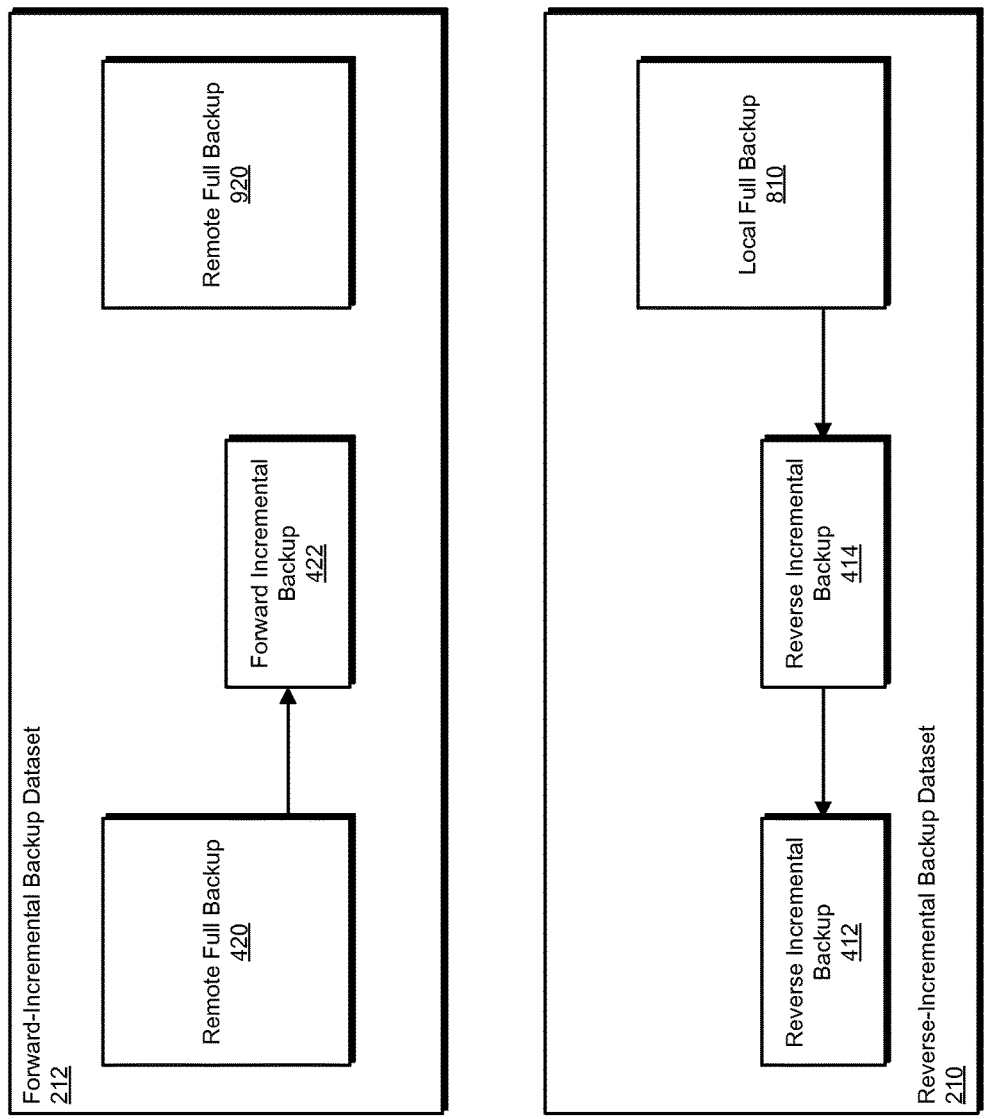
FIG. 9 is a block diagram of exemplary backup datasets.

Returning to FIG. 3, in some examples, the systems and methods described herein may generate remote full backups at the secondary storage system in addition to or as an alternative to generating forward incremental backups (e.g., to reduce the number of forward incremental backups that depend on a single remote full backup). Using FIG. 9 as an example, at or after time 506, remote-backup module 106 may transform forward-incremental backup dataset 212 as shown in FIG. 7 into forward-incremental backup dataset 212 as shown in FIG. 9 in response to (or at any point in time after) the creation of local full backup 810 and/or reverse incremental backup 414 by (1) transferring local full backup 810 to secondary storage system 206 and (2) generating remote full backup 920 from local full backup 810. In this example, the systems and methods disclosed herein may later recover the state of data source 208 as of time 506 directly from remote full backup 920.

Figure 10:
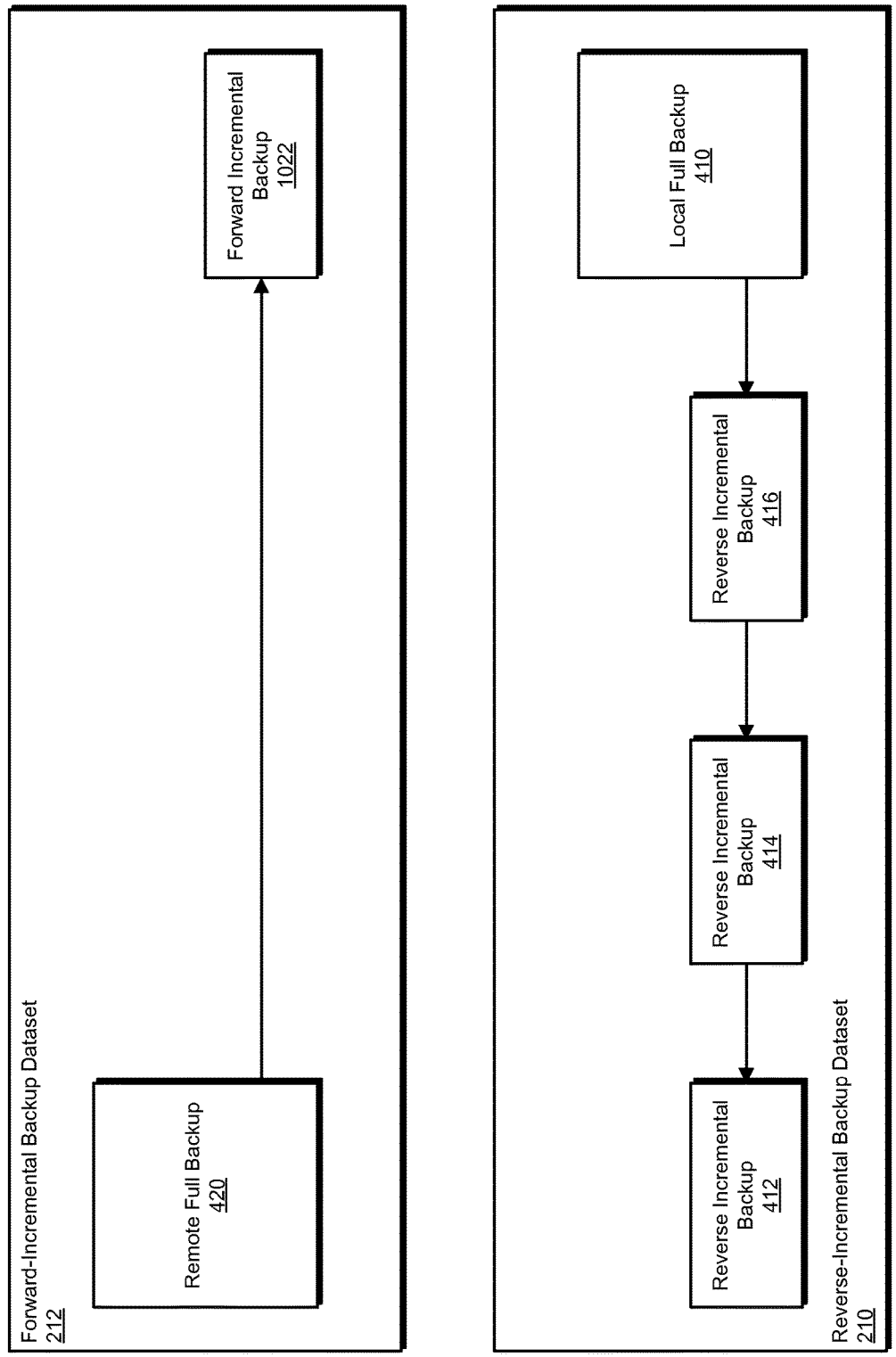
FIG. 10 is a block diagram of exemplary backup datasets.

As mentioned above, remote-backup module 106 may generate a remote full backup or a forward incremental backup at the secondary storage system in response to the creation of each local full backup of the data source at the primary storage system (e.g., as illustrated in FIGS. 4-8). Alternatively, remote-backup module 106 may not generate a remote full backup or a forward incremental backup at the secondary storage system in response to the creation of each local full backup of the data source at the primary storage system. For example, remote-backup module 106 may generate a remote full backup or a forward incremental backup at the secondary storage system in response to the creation of every third local full backup of the data source at the primary storage system (e.g., as illustrated in FIG. 10). In these situations, remote-backup module 106 may generate a forward incremental backup of a data source on the secondary storage system by (1) identifying the difference between (i) the most recent state of the data source that has been replicated to the secondary storage system and (ii) the state of the data source captured by the most recent local full backup, (2) transferring the difference from the primary storage system to the secondary storage system, and (3) generating the forward incremental backup from the transferred difference.

Using FIG. 10 as an example, at or after time 508, remote-backup module 106 may transform forward-incremental backup dataset 212 as shown in FIG. 6 into forward-incremental backup dataset 212 as shown in FIG. 10 in response to (or at any point in time after) the creation of local full backup 410 and/or reverse incremental backup 416 by (1) transferring reverse incremental backups 412-416 (e.g., as a single forward incremental backup) to secondary storage system 206 and (2) generating forward incremental backup 1022 from reverse incremental backups 412-416. In the example illustrated in FIG. 10, the systems and methods disclosed herein may later recover the state of data source 208 as of time 508 by applying forward incremental backup 1022 to remote full backup 420.

In some examples, remote-backup module 106 may generate remote full backups and/or forward incremental backups of the data source on the secondary storage system according to a remote backup schedule that indicates (1) a schedule for generating remote full backups at the secondary storage system and/or (2) a schedule for generating forward incremental backups at the secondary storage system. In at least one example, remote-backup module 106 may enable an administrator to configure the remote backup schedule by enabling the administrator to select (1) the schedule for generating remote full backups at the secondary storage system and/or (2) the schedule for generating forward incremental backups at the secondary storage system. In some examples, remote-backup module 106 may enable an administrator to configure the remote backup schedule as part of enabling the administrator to configure a local backup schedule (e.g., a schedule for generating local full backup and/or reverse incremental backups). Additionally or alternatively, remote-backup module 106 may enable an administrator to configure remote backup schedules independent of local backup schedules (e.g., a schedule for generating local full backup and/or reverse incremental backups). Upon completion of step 304, exemplary method 300 in FIG. 3 may terminate.

As explained above, by maintaining forward-incremental backup datasets as remote backups of reverse-incremental backup datasets, the systems and methods described herein may reduce or eliminate the transmission and/or storage of redundant data to secondary storage systems. For example, the systems and methods described herein may generate a forward-incremental backup dataset on a secondary storage system as a backup of a reverse-incremental backup dataset by generating a remote full backup that corresponds to the first full backup of the reverse-incremental backup dataset and forward incremental backups that correspond to each subsequent full backup of the reverse-incremental backup dataset, which may reduce or eliminate the transmission and/or storage of each full backup of the reverse-incremental backup dataset to the secondary storage system.

Figure 11:
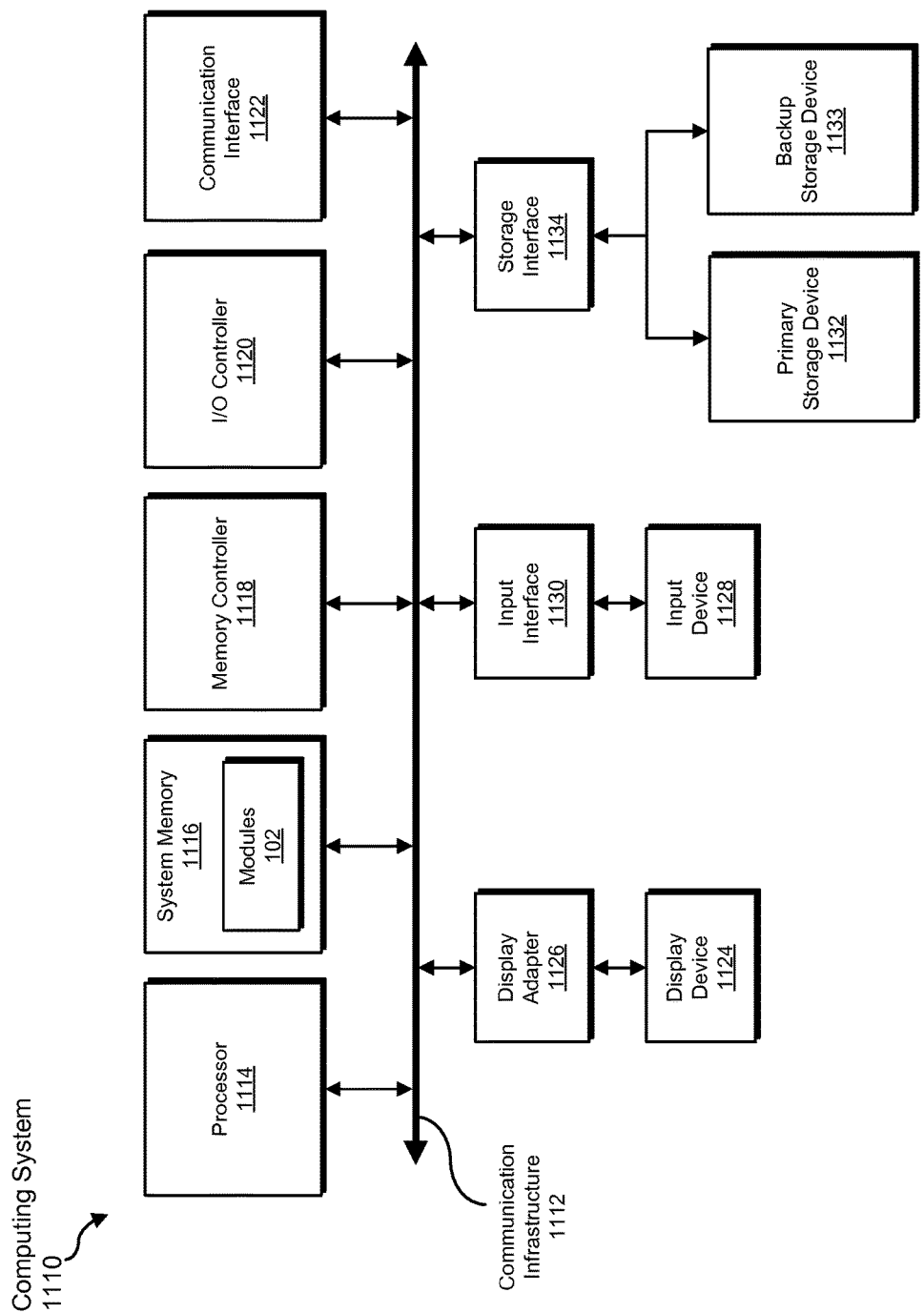
FIG. 11 is a block diagram of an exemplary computing system capable of implementing one or more of the embodiments described and/or illustrated herein.

FIG. 11 is a block diagram of an exemplary computing system 1110 capable of implementing one or more of the embodiments described and/or illustrated herein. For example, all or a portion of computing system 1110 may perform and/or be a means for performing, either alone or in combination with other elements, one or more of the steps described herein (such as one or more of the steps illustrated in FIG. 3). All or a portion of computing system 1110 may also perform and/or be a means for performing any other steps, methods, or processes described and/or illustrated herein.

Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may include at least one processor 1114 and a system memory 1116.

Processor 1114 generally represents any type or form of physical processing unit (e.g., a hardware-implemented central processing unit) capable of processing data or interpreting and executing instructions. In certain embodiments, processor 1114 may receive instructions from a software application or module. These instructions may cause processor 1114 to perform the functions of one or more of the exemplary embodiments described and/or illustrated herein.

System memory 1116 generally represents any type or form of volatile or non-volatile storage device or medium capable of storing data and/or other computer-readable instructions. Examples of system memory 1116 include, without limitation, Random Access Memory (RAM), Read Only Memory (ROM), flash memory, or any other suitable memory device. Although not required, in certain embodiments computing system 1110 may include both a volatile memory unit (such as, for example, system memory 1116) and a non-volatile storage device (such as, for example, primary storage device 1132, as described in detail below). In one example, one or more of modules 102 from FIG. 1 may be loaded into system memory 1116.

In certain embodiments, exemplary computing system 1110 may also include one or more components or elements in addition to processor 1114 and system memory 1116. For example, as illustrated in FIG. 11, computing system 1110 may include a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an Industry Standard Architecture (ISA), Peripheral Component Interconnect (PCI), PCI Express (PCIe), or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 1130, and storage interface 1134.

Communication interface 1122 broadly represents any type or form of communication device or adapter capable of facilitating communication between exemplary computing system 1110 and one or more additional devices. For example, in certain embodiments communication interface 1122 may facilitate communication between computing system 1110 and a private or public network including additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution.

As illustrated in FIG. 11, computing system 1110 may also include at least one display device 1124 coupled to communication infrastructure 1112 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, exemplary computing system 1110 may also include at least one input device 1128 coupled to communication infrastructure 1112 via an input interface 1130. Input device 1128 generally represents any type or form of input device capable of providing input, either computer or human generated, to exemplary computing system 1110. Examples of input device 1128 include, without limitation, a keyboard, a pointing device, a speech recognition device, or any other input device.

As illustrated in FIG. 11, exemplary computing system 1110 may also include a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a solid state drive, a floppy disk drive, a magnetic tape drive, an optical disk drive, a flash drive, or the like. Storage interface 1134 generally represents any type or form of interface or device for transferring data between storage devices 1132 and 1133 and other components of computing system 1110.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also include other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11. Computing system 1110 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1110 may be configured as an Application Specific Integrated Circuit (ASIC) adapted to implement one or more of the exemplary embodiments disclosed herein.

Figure 12:
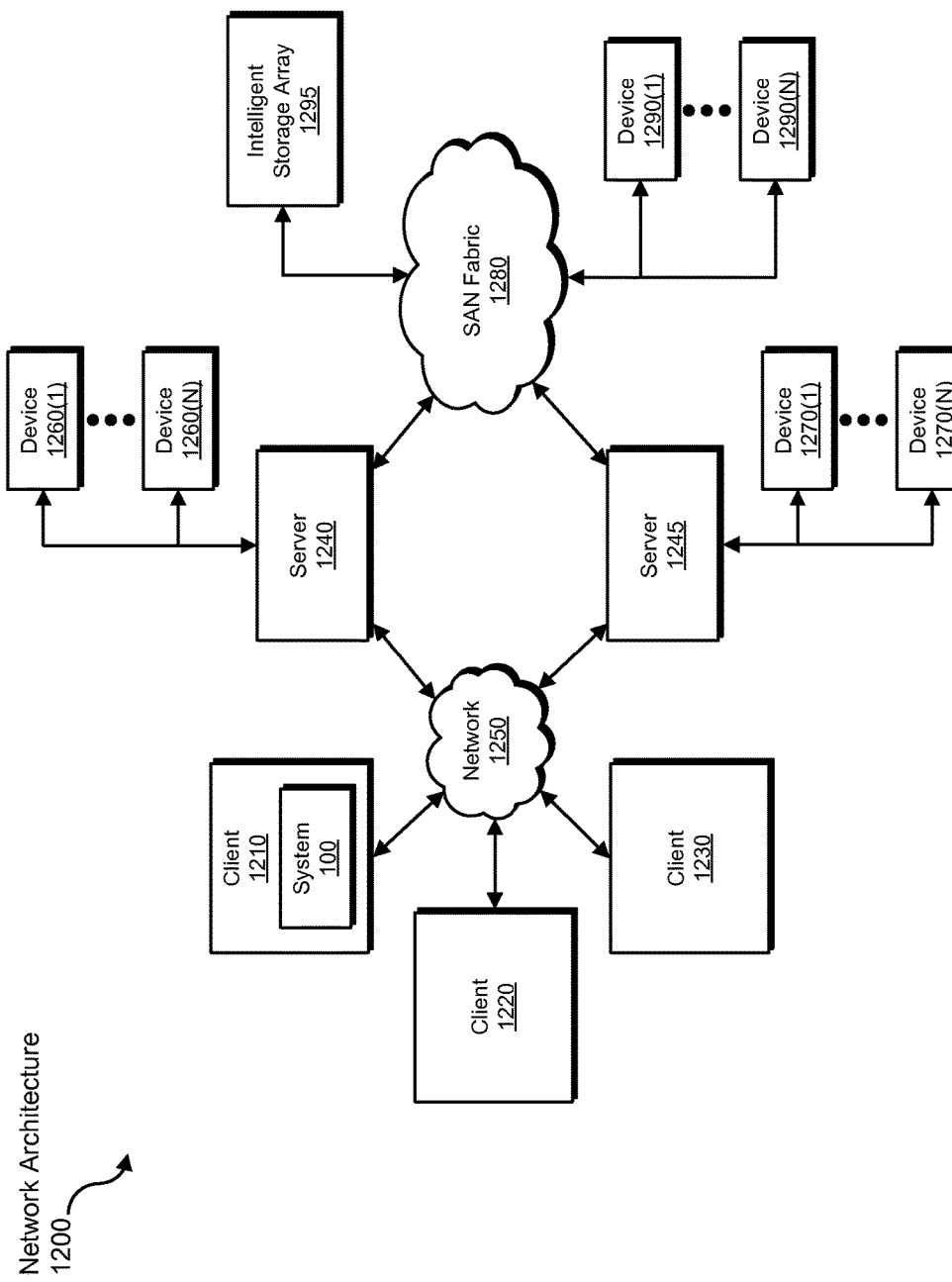
FIG. 12 is a block diagram of an exemplary computing network capable of implementing one or more of the embodiments described and/or illustrated herein.

FIG. 12 is a block diagram of an exemplary network architecture 1200 in which client systems 1210, 1220, and 1230 and servers 1240 and 1245 may be coupled to a network 1250. As detailed above, all or a portion of network architecture 1200 may perform and/or be a means for performing, either alone or in combination with other elements, one or more of the steps disclosed herein (such as one or more of the steps illustrated in FIG. 3). All or a portion of network architecture 1200 may also be used to perform and/or be a means for performing other steps and features set forth in the instant disclosure.

Client systems 1210, 1220, and 1230 generally represent any type or form of computing device or system, such as exemplary computing system 1110 in FIG. 11. Similarly, servers 1240 and 1245 generally represent computing devices or systems, such as application servers or database servers, configured to provide various database services and/or run certain software applications. Network 1250 generally represents any telecommunication or computer network including, for example, an intranet, a WAN, a LAN, a PAN, or the Internet. In one example, client systems 1210, 1220, and/or 1230 and/or servers 1240 and/or 1245 may include all or a portion of system 100 from FIG. 1.

As illustrated in FIG. 12, one or more storage devices 1260(1)-(N) may be directly attached to server 1240. Similarly, one or more storage devices 1270(1)-(N) may be directly attached to server 1245. Storage devices 1260(1)-(N) and storage devices 1270(1)-(N) generally represent any type or form of storage device or medium capable of storing data and/or other computer-readable instructions. In certain embodiments, storage devices 1260(1)-(N) and storage devices 1270(1)-(N) may represent Network-Attached Storage (NAS) devices configured to communicate with servers 1240 and 1245 using various protocols, such as Network File System (NFS), Server Message Block (SMB), or Common Internet File System (CIFS).

Servers 1240 and 1245 may also be connected to a Storage Area Network (SAN) fabric 1280. SAN fabric 1280 generally represents any type or form of computer network or architecture capable of facilitating communication between a plurality of storage devices. SAN fabric 1280 may facilitate communication between servers 1240 and 1245 and a plurality of storage devices 1290(1)-(N) and/or an intelligent storage array 1295. SAN fabric 1280 may also facilitate, via network 1250 and servers 1240 and 1245, communication between client systems 1210, 1220, and 1230 and storage devices 1290(1)-(N) and/or intelligent storage array 1295 in such a manner that devices 1290(1)-(N) and array 1295 appear as locally attached devices to client systems 1210, 1220, and 1230. As with storage devices 1260(1)-(N) and storage devices 1270(1)-(N), storage devices 1290(1)-(N) and intelligent storage array 1295 generally represent any type or form of storage device or medium capable of storing data and/or other computer-readable instructions.

In certain embodiments, and with reference to exemplary computing system 1110 of FIG. 11, a communication interface, such as communication interface 1122 in FIG. 11, may be used to provide connectivity between each client system 1210, 1220, and 1230 and network 1250. Client systems 1210, 1220, and 1230 may be able to access information on server 1240 or 1245 using, for example, a web browser or other client software. Such software may allow client systems 1210, 1220, and 1230 to access data hosted by server 1240, server 1245, storage devices 1260(1)-(N), storage devices 1270(1)-(N), storage devices 1290(1)-(N), or intelligent storage array 1295. Although FIG. 12 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1240, server 1245, storage devices 1260(1)-(N), storage devices 1270(1)-(N), storage devices 1290(1)-(N), intelligent storage array 1295, or any combination thereof. All or a portion of one or more of the exemplary embodiments disclosed herein may also be encoded as a computer program, stored in server 1240, run by server 1245, and distributed to client systems 1210, 1220, and 1230 over network 1250.

As detailed above, computing system 1110 and/or one or more components of network architecture 1200 may perform and/or be a means for performing, either alone or in combination with other elements, one or more steps of an exemplary method for maintaining remote backups of reverse-incremental backup datasets.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a reverse-incremental backup dataset to be transformed, transform the reverse-incremental backup dataset into a forward-incremental backup dataset, output a result of the transformation to a secondary storage system, use the result of the transformation to maintain a remote backup of the reverse-incremental backup dataset at the secondary storage system, and store the result of the transformation to the secondary storage system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for maintaining remote backups of reverse-incremental backup datasets, at least a portion of the method being performed by a computing device comprising at least one processor, the method comprising:

receiving a request to back up, from a local storage system to a remote storage system, a reverse-incremental backup dataset of a data source comprising a plurality of data units, wherein the reverse-incremental backup dataset is stored at the local storage system and comprises:

a local full backup of the data source, stored at the local storage system, that enables the data source to be restored at the local storage system to a most recent backed-up state and captures the most recent backed-up state of each of the plurality of data units of the data source; and one or more reverse incremental backups of the data source, stored at the local storage system, that enable the data source to be restored at the local storage system to a prior backed-up state and capture a first difference between the most recent backed-up state of a first portion of the plurality of data units of the data source captured by the local full backup and the prior backed-up state of the first portion of the plurality of data units, wherein:

the most recent backed-up state of the data source is capable of being restored at the local storage system directly from the local full backup;

the prior backed-up state of the data source is capable of being restored at the local storage system by applying the first difference to the local full backup; and the prior backed-up state of the first portion of the plurality of data units existed prior to the most recent backed-up state of the first portion the plurality of data units and concurrent with the most recent backed-up state of a second portion the plurality of data units; and backing up, while refraining from transferring the local full backup of the data source from the local storage system to the remote storage system, the reverse-incremental backup dataset of the data source to the remote storage system to enable the data source to be restored at the remote storage system to the most recent backed-up state or the prior backed-up state without the local full backup by creating, at the remote storage system, a forward-incremental backup dataset of the data source from the reverse-incremental backup dataset of the data source, the forward-incremental backup dataset comprising:
- a remote full backup of the data source, stored at the remote storage system, that enables the data source to be restored at the remote storage system to the prior backed-up state rather than the most-recent backed up state and captures:
  - the prior backed-up state of the first portion of the plurality of data units instead of the most recent backed-up state of the first portion of the plurality of data units captured by the local full backup; and
  - the most recent backed-up state of the second portion of the plurality of data units of the data source; and
- one or more forward incremental backups, stored at the remote storage system, that enable the data source to be restored at the remote storage system to the most recent backed-up state and capture a second difference between the prior backed-up state of the first portion of the plurality of data units captured by the remote full backup and the most recent backed-up state of the first portion of the plurality of data units, wherein:
  - the most-recent backed-up state of the data source is capable of being restored at the remote storage system by applying the second difference to the remote full backup; and
  - the prior backed-up state of the data source is capable of being restored at the remote storage system directly from the remote full backup.

2. The method of claim 1, wherein:
creating the forward-incremental backup dataset of the data source from the reverse-incremental backup dataset of the data source comprises generating the remote full backup of the data source on the remote storage system by transferring, from the local storage system to the remote storage system, a prior full backup of the data source;
the prior full backup of the data source comprises the prior backed-up state of the first portion of the plurality of data units.

3. The method of claim 1, wherein:
creating the forward-incremental backup dataset of the data source from the reverse-incremental backup dataset of the data source comprises generating the one or more forward incremental backups on the remote storage system by transferring, from the local storage system to the remote storage system, the second difference between the most recent backed-up state of the first portion of the plurality of data units and the prior backed-up state of the first portion of the plurality of data units;
the one or more forward incremental backups comprise the second difference between the most recent backed-up state of the first portion of the plurality of data units and the prior backed-up state of the first portion of the plurality of data units.

4. The method of claim 1, wherein:
creating the forward-incremental backup dataset of the data source from the reverse-incremental backup dataset of the data source comprises generating an additional forward incremental backup on the remote storage system by transferring, from the local storage system to the remote storage system, a difference between the most recent backed-up state of the first portion of the plurality of data units and a backed-up state of the first portion of the plurality of data units represented by the one or more forward incremental backups;
the additional forward incremental backup comprises the difference between the most recent backed-up state of the first portion of the plurality of data units and the backed-up state of the first portion of the plurality of data units represented by the one or more forward incremental backups;
the forward-incremental backup dataset on the remote storage system comprises the additional forward incremental backup.

5. The method of claim 1, wherein creating the forward-incremental backup dataset of the data source from the reverse-incremental backup dataset of the data source comprises generating, in response to the creation of the local full backup of the data source and at the remote storage system, an additional remote full backup of the data source that comprises the most recent backed-up state of the first portion of the plurality of data units.

6. The method of claim 1, wherein creating the forward-incremental backup dataset of the data source from the reverse-incremental backup dataset of the data source comprises generating, in response to the creation of the local full backup of the data source and at the remote storage system, an additional forward incremental backup that comprises a difference between a backed-up state of the first portion of the plurality of data units represented by the one or more forward incremental backups and the most recent backed-up state of the first portion of the plurality of data units.

7. The method of claim 1, wherein creating the forward-incremental backup dataset of the data source from the reverse-incremental backup dataset of the data source comprises generating, in response to the creation of the local full backup of the data source and at the remote storage system:
- no additional remote full backups of the data source that comprises the most recent backed-up state of the first portion of the plurality of data units;
- no additional forward incremental backups that comprises a difference between a backed-up state of the first portion of the plurality of data units represented by the one or more forward incremental backups and the most recent backed-up state of the first portion of the plurality of data units.

8. The method of claim 1, wherein creating the forward-incremental backup dataset of the data source from the reverse-incremental backup dataset of the data source comprises generating the forward-incremental backup dataset of the data source on the remote storage system according to a remote backup schedule that indicates at least one of:
- a schedule for generating remote full backups at the remote storage system;
- a schedule for generating forward incremental backups at the remote storage system.

9. The method of claim 8, further comprising enabling an administrator to select at least one of:
- the schedule for generating remote full backups at the remote storage system;
- the schedule for generating forward incremental backups at the remote storage system.

10. The method of claim 8, wherein the remote backup schedule is independent of a local backup schedule.

11. A system for maintaining remote backups of reverse-incremental backup datasets, the system comprising:
- a local-backup module, stored in memory, that receives a request to back up, from a local storage system to a remote storage system, a reverse-incremental backup dataset of a data source comprising a plurality of data units, wherein the reverse-incremental backup dataset is stored at the local storage system and comprises:
a local full backup of the data source, stored at the local storage system, that enables the data source to be restored at the local storage system to a most recent backed-up state and captures the most recent backed-up state of each of the plurality of data units of the data source; and
one or more reverse incremental backups of the data source, stored at the local storage system, that enable the data source to be restored at the local storage system to a prior backed-up state and capture a first difference between the most recent backed-up state of a first portion of the plurality of data units of the data source captured by the local full backup and the prior backed-up state of the first portion of the plurality of data units, wherein:
the most recent backed-up state of the data source is capable of being restored at the local storage system directly from the local full backup;
the prior backed-up state of the data source is capable of being restored at the local storage system by applying the first difference to the local full backup; and
the prior backed-up state of the first portion of the plurality of data units existed prior to the most recent backed-up state of the first portion the plurality of data units and concurrent with the most recent backed-up state of a second portion the plurality of data units;
a remote-backup module, stored in memory, that backs up, while refraining from transferring the local full backup of the data source to the remote storage system, the reverse-incremental backup dataset of the data source to the remote storage system to enable the data source to be restored at the remote storage system to the most recent backed-up state or the prior backed-up state without the local full backup by creating, at the remote storage system, a forward-incremental backup dataset of the data source from the reverse-incremental backup dataset of the data source, the forward-incremental backup dataset comprising:
a remote full backup of the data source, stored at the remote storage system, that enables the data source to be restored at the remote storage system to the prior backed-up state rather than the most-recent backed up state and captures:
the prior backed-up state of the first portion of the plurality of data units instead of the most recent backed-up state of the first portion of the plurality of data units captured by the local full backup; and
the most recent backed-up state of the second portion of the plurality of data units of the data source; and
one or more forward incremental backups, stored at the remote storage system, that enable the data source to be restored at the remote storage system to the most recent backed-up state and capture a second difference between the prior backed-up state of the first portion of the plurality of data units captured by the remote full backup and the most recent backed-up state of the first portion of the plurality of data units, wherein:
the most-recent backed-up state of the data source is capable of being restored at the remote storage system by applying the second difference to the remote full backup; and
the prior backed-up state of the data source is capable of being restored at the remote storage system directly from the remote full backup; and
at least one processor that executes the local-backup module and the remote-backup module.

12. The system of claim 11, wherein:
the local-backup module further transfers, from the local storage system to the remote storage system, a prior full backup of the data source;
the remote-backup module creates the forward-incremental backup dataset of the data source from the reverse-incremental backup dataset of the data source by generating the remote full backup of the data source on the remote storage system from the prior full backup of the data source;
the prior full backup of the data source comprises the prior backed-up state of the first portion of the plurality of data units.

13. The system of claim 11, wherein:
the local-backup module further transfers, from the local storage system to the remote storage system, the second difference between the most recent backed-up state of the first portion of the plurality of data units and the prior backed-up state of the first portion of the plurality of data units;
the remote-backup module creates the forward-incremental backup dataset of the data source from the reverse-incremental backup dataset of the data source by generating the one or more forward incremental backups on the remote storage system from the second difference between the most recent backed-up state of the first portion of the plurality of data units and the prior backed-up state of the first portion of the plurality of data units;
the one or more forward incremental backups comprise the second difference between the most recent backed-up state of the first portion of the plurality of data units and the prior backed-up state of the first portion of the plurality of data units.

14. The system of claim 11, wherein:
the local-backup module further transfers, from the local storage system to the remote storage system, a difference between the most recent backed-up state of the first portion of the plurality of data units and a backed-up state of the first portion of the plurality of data units represented by the one or more forward incremental backups;
the remote-backup module creates the forward-incremental backup dataset of the data source from the reverse-incremental backup dataset of the data source by generating an additional forward incremental backup on the remote storage system from the difference between the most recent backed-up state of the first portion of the plurality of data units and the backed-up state of the first portion of the plurality of data units represented by the one or more forward incremental backups;
the additional forward incremental backup comprises the difference between the most recent backed-up state of the first portion of the plurality of data units and the backed-up state of the first portion of the plurality of data units represented by the one or more forward incremental backups;
the forward-incremental backup dataset on the remote storage system comprises the additional forward incremental backup.

15. The system of claim 11, wherein the remote-backup module creates the forward-incremental backup dataset of the data source from the reverse-incremental backup dataset of the data source by generating, in response to the creation of the local full backup of the data source and at the remote storage system, an additional remote full backup of the data source that comprises the most recent backed-up state of the first portion of the plurality of data units.

16. The system of claim 11, wherein the remote-backup module creates the forward-incremental backup dataset of the data source from the reverse-incremental backup dataset of the data source by generating, in response to the creation of the local full backup of the data source and at the remote storage system, an additional forward incremental backup that comprises a difference between a backed-up state of the first portion of the plurality of data units represented by the one or more forward incremental backups and the most recent backed-up state of the first portion of the plurality of data units.

17. The system of claim 11, wherein the remote-backup module creates the forward-incremental backup dataset of the data source from the reverse-incremental backup dataset of the data source by generating, in response to the creation of the local full backup of the data source and at the remote storage system:
   no additional remote full backups of the data source that comprises the most recent backed-up state of the first portion of the plurality of data units;
   no additional forward incremental backups that comprises a difference between a backed-up state of the first portion of the plurality of data units represented by the one or more forward incremental backups and the most recent backed-up state of the first portion of the plurality of data units.

18. The system of claim 11, wherein the remote-backup module creates the forward-incremental backup dataset of the data source from the reverse-incremental backup dataset of the data source by generating the forward-incremental backup dataset of the data source on the remote storage system according to a remote backup schedule that indicates at least one of:
   a schedule for generating remote full backups at the remote storage system;
   a schedule for generating forward incremental backups at the remote storage system.

19. The system of claim 18, wherein the remote-backup module further enables an administrator to select at least one of:
   the schedule for generating remote full backups at the remote storage system;
   the schedule for generating forward incremental backups at the remote storage system.

20. A non-transitory computer-readable medium comprising one or more computer-executable instructions that, when executed by at least one processor of a computing device, cause the computing device to:
   receive a request to back up, from a local storage system to a remote storage system, a reverse-incremental backup dataset of a data source comprising a plurality of data units, wherein the reverse-incremental backup dataset is stored at the local storage system and comprises:
      a local full backup of the data source, stored at the local storage system, that enables the data source to be restored at the local storage system to a most recent backed-up state and captures the most recent backed-up state of each of the plurality of data units of the data source; and
      one or more reverse incremental backups of the data source, stored at the local storage system, that enable the data source to be restored at the local storage system to a prior backed-up state and capture a first difference between the most recent backed-up state of a first portion of the plurality of data units of the data source captured by the local full backup and the prior backed-up state of the first portion of the plurality of data units, wherein:
         the most recent backed-up state of the data source is capable of being restored at the local storage system directly from the local full backup;
         the prior backed-up state of the data source is capable of being restored at the local storage system by applying the first difference to the local full backup; and
         the prior backed-up state of the first portion of the plurality of data units existed prior to the most recent backed-up state of the first portion the plurality of data units and concurrent with the most recent backed-up state of a second portion the plurality of data units; and
   back up, while refraining from transferring the local full backup of the data source from the local storage system to the remote storage system, the reverse-incremental backup dataset of the data source to the remote storage system to enable the data source to be restored at the remote storage system to the most recent backed-up state or the prior backed-up state without the local full backup by creating, at the remote storage system, a forward-incremental backup dataset of the data source from the reverse-incremental backup dataset of the data source, the forward-incremental backup dataset comprising:
      a remote full backup of the data source, stored at the remote storage system, that enables the data source to be restored at the remote storage system to the prior backed-up state rather than the most-recent backed up state and captures:
         the prior backed-up state of the first portion of the plurality of data units instead of the most recent backed-up state of the first portion of the plurality of data units captured by the local full backup; and
         the most recent backed-up state of the second portion of the plurality of data units of the data source; and
      one or more forward incremental backups, stored at the remote storage system, that enable the data source to be restored at the remote storage system to the most recent backed-up state and capture a second difference between the prior backed-up state of the first portion of the plurality of data units captured by the remote full backup and the most recent backed-up state of the first portion of the plurality of data units, wherein:
         the most-recent backed-up state of the data source is capable of being restored at the remote storage system by applying the second difference to the remote full backup; and
         the prior backed-up state of the data source is capable of being restored at the remote storage system directly from the remote full backup.

* * * * *